United States Patent [19]
Chocola et al.

[11] Patent Number: 5,555,842
[45] Date of Patent: Sep. 17, 1996

[54] METHOD AND APPARATUS FOR FEEDING HORSES

[75] Inventors: Caryl M. Chocola, Okemos, Mich.; Timothy W. Momont, Wolcottville; Charles R. Bird, Milford, both of Ind.

[73] Assignee: KC Equine Systems, Inc., Okemos, Mich.

[21] Appl. No.: 134,540

[22] Filed: Oct. 8, 1993

[51] Int. Cl.$^6$ .................................................. A01K 5/02
[52] U.S. Cl. ..................... 119/51.11; 119/56.1; 119/52.1
[58] Field of Search ............................... 119/51.11, 52.1, 119/52.4, 53, 56.1, 56.2, 51.01, 51.13, 57.4, 57.1

[56] References Cited

U.S. PATENT DOCUMENTS

| | | | |
|---|---|---|---|
| 3,376,856 | 4/1968 | Crippen . | |
| 3,550,812 | 12/1970 | Brown | 119/51.11 |
| 3,800,745 | 4/1974 | Fassauer | 119/56.1 |
| 3,962,997 | 5/1976 | Ruth | 119/51.11 |
| 4,183,327 | 1/1980 | Olsen | 119/51.11 |
| 4,200,060 | 4/1980 | Van Daele . | |
| 4,235,200 | 11/1980 | Shay | 119/51.11 |
| 4,296,710 | 10/1981 | Sillers | 119/51.11 |
| 4,363,291 | 12/1982 | Harmsen | 119/56.1 |
| 4,665,862 | 5/1987 | Pitchford | 119/51.11 |
| 5,275,129 | 1/1994 | Vigessa et al. | 119/51.11 |

FOREIGN PATENT DOCUMENTS 3738156  10/1988  Germany ........................... 119/51.11

OTHER PUBLICATIONS

Watkins, Robert A., "Dandy Feeder", brochure, undated.
Rains, J. A., "High Tech Horsekeeping," The Western Horse at 20.
"Automatic Feeders: Barn Butlers at Your Service," Modern Horse Breeding at 30.
"Feeding Around the Clock For Full Performance," Modern Horse Breeding at 24.
"Passageway to Good Health," Modern Horse Breeding at 7.
"Sell 'em Luxury Living," Rural Builders, Sep., 1987, at 12.
"The File: Indexing Air Quality," Equus v. 139, p. 20–22, May 1989.
"Will Automated Feeders Scoop the Competition," Modern Horse Breeding at 30–31.
Brochure entitled "EquiSystems—High-tech Horsekeeping," EquiSystems, Inc.
"The Equine Environment: Saving His Health, Your Money," The Horse Digest at 16.
Rains, J. A., "High-Tech Horsekeeping," Appaloosa World, Feb. 1987 at 86.
DuTeil, K. K., "How to Save Your Horse From Colic," Equus v. 139, p. 64, May 1989.
DuTeil, K. K., "The File: March of Dollars," Equus v. 140, p. 31, Jun. 1989.
Wheeler, L. L., "Preventing Mold—Preventive Measures," The Equine Market and Horseman's Guide, Apr. 15, 1990.
Ambrosiano, N. W., "The Better Barn," Equus v. 148, p. 56, Feb. 1990.
Brochure entitled "EquiSystems High-Tech Horsekeeping 'Introduces' Controlled Feeding for Horses," EquiSystems.
Brochure entitled "New Profit-making Ideas for Automating Your Fish Feeding," Chore-Time.
Brochure, Knight Equine Products Co., "The Excalibur", Nov. 11, 1993.

*Primary Examiner*—John G. Weiss
*Attorney, Agent, or Firm*—Harness, Dickey & Pierce, P.L.C.

[57] ABSTRACT

A method and apparatus for automatically providing a preset, metered amount of horse feed to a stall. The apparatus includes a storage hopper and an auger transport assembly, which are both disposed upon a wall of the stall. The method includes rotating the auger and thereby delivering feed from the storage hopper to a location inside the stall.

32 Claims, 4 Drawing Sheets

METHOD AND APPARATUS FOR FEEDING HORSES

BACKGROUND OF THE INVENTION

1. Field of the Invention

This invention relates to the automated dispensing of animal feed, and more particularly to a method and apparatus for feeding horses.

2. Description of the Related Art

It has long been recognized that regulating the amount of feed given to horses is important to maintaining the health and conditioning of the horses. For this reason, the traditional method of feeding horses involves measuring and delivering feed to horses in predetermined amounts. Due to its inherently labor-intensive and time consuming nature, this feeding method is usually performed twice a day providing relatively large amounts of feed on each occasion. Twice-daily feeding, however, is inconsistent with the natural feeding habits of horses. It is well-known that horses are, by nature, grazing animals. As such, it is more natural for a horse to consume rather small amounts of feed more frequently, instead of relatively large amounts of feed several times daily.

In addition, there are a number of problems which may be encountered when feeding horses according to a typical twice-daily feeding schedule. First, many of the nutrients which are in the feed are not metabolized by the horse when the feed is digested. Second, the relatively large amounts of feed which are provided to a horse during a single feeding may also produce gas colic, widely varying levels of certain blood constituents (such as blood sugars and lactic acid), and may also adversely influence bone density.

For these reasons, it is believed that providing smaller, measured amounts of feed at more frequent intervals will result in the improved overall well-being of a horse. For example, providing smaller amounts of feed at 2–4 hour intervals improves the absorption of nutrients, reduces gas colic, causes the level of certain constituents within the blood to be more uniform throughout the day, and could possibly improve the bone density due to the improved absorption of nutrients. Additionally, providing smaller amounts of feed at more frequent intervals reduces feed waste since the feed is more efficiently used by the horse. Notwithstanding the benefits obtainable through such a regular feeding program, considerations regarding the labor-intensive demands of frequent, measured feeding have often made such a feeding program prohibitive.

Accordingly, various attempts have been made at developing automated systems for providing horses relatively small amounts of feed at relatively frequent intervals. One such automated system is marketed under the tradename CABLEVEY which is supplied by EquiSystems, Fort Wayne, Ind. In the CABLEVEY system, feed passes from a hopper into an overhead continuous circuit of steel tubing. A cable fitted with molded plastic discs moves the feed throughout the barn to individual containers, or feed drops, situated above the stalls. When all of the feed drops are filled, the system shuts down until a timer releases the feed from the feed drops into the stalls. Once the feed has been released, the system repeats the operation and refills the feed drops in preparation for the next feeding. The CABLEVEY system is typically used to feed horses small, measured amounts of feed six to eight times per day. Another automatic feeding system for horses is sold under the tradename GOOD-O-MATIC available from Goode, Inc., Fort Worth, Tex. The GOOD-O-MATIC feeding system permits an operator to set controls for the amount, time, and frequency of feeding. The system then weighs and dispenses the proper amount of feed automatically.

While the known automatic feeding systems are generally effective, certain particular models may have certain disadvantages. For example, a mechanical feeder which is located within the stall may be easily damaged by a horse. That is, after the horse determines that the automatic feeder is the source of its food, the horse may exert great effort attempting to obtain feed from the feeder. It has been observed that, in attempting to obtain feed, a horse may strike, chew or bump at an automatic feeder causing severe damage to the device.

SUMMARY OF THE INVENTION

One feature of the present invention relates to an apparatus for mechanically providing an amount of feed to a horse within a stall which is defined at least in part by a partition. The apparatus comprises means for storing the feed which is located on the outer side of the partition. In addition, the apparatus further comprises means for transporting the feed through the partition to the inner side of the partition so that the feed can be delivered to the stall.

Another feature of the present invention relates to a method for dispensing an amount of horse feed into a stall using an automatic feeder. The stall is defined at least in part by a generally vertically disposed partition having first and second sides, and the automatic feeder includes a feed storage bin and an auger in communication with the feed storage bin. The method comprises the steps of rotating the auger so as to deliver feed from the feed storage bin to a location inside the stall.

Accordingly, it is a general object of the invention to provide a method and apparatus for the automated dispensing of animal feed, and more particularly to provide a method and apparatus for automatically providing a preset, metered amount of horse feed to a stall.

A further object of the invention is to provide a method and apparatus for automated dispensing of animal feed whereby a measured ration of feed is provided to a horse at several regular, timed intervals.

Another object of the invention is to provide a method and apparatus for automatically providing an amount of horse feed to a stall which will avoid dispensing feed if the apparatus fails to operate properly.

An additional object of the invention is to provide a method and apparatus for feeding horses wherein the apparatus may be conveniently accessed for refilling, cleaning and servicing.

A further object of the invention is to provide a method and apparatus for providing an amount of horse feed to a stall which is operable to dispense the feed either automatically or manually.

It is yet a further object of the invention to provide a method and apparatus for automatically providing an amount of horse feed to a stall wherein the automatic feeder is positioned outside of the stall and, therefore, is not generally susceptible to be damaged by a horse.

Another object of the present invention is to provide a method and apparatus for the automated dispensing of animal feed which is relatively simple and low in cost, yet is reliably able to automatically provide a preset, metered amount of horse feed to a stall.

BRIEF DESCRIPTION OF THE DRAWINGS

The structure and manner of operation of the invention, together with the further objects and advantages thereof, may best be understood by reference to the following description taken in conjunction with the accompanying drawings, in which identical reference numerals identify similar elements, and in which.

DESCRIPTION OF THE PREFERRED EMBODIMENTS

The following discussion of the preferred embodiments of the present invention is merely exemplary in nature. Accordingly, this discussion is in no way intended to limit the scope of the invention, application of the invention, or the uses of the invention.

Figure 1:
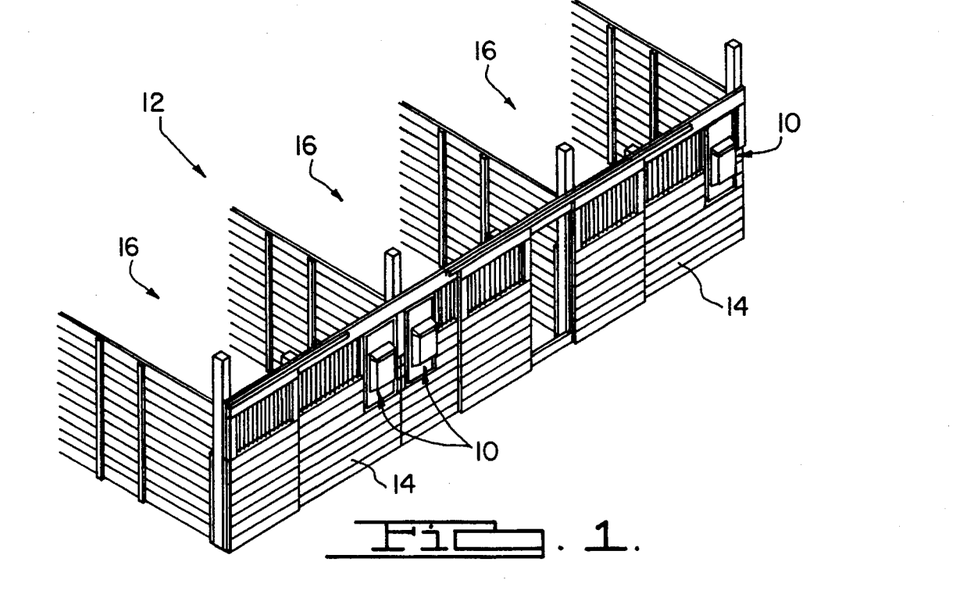
FIG. 1 is a perspective view of an apparatus for feeding horses according to the teachings of one preferred embodiment of the present invention.
Figure 2:
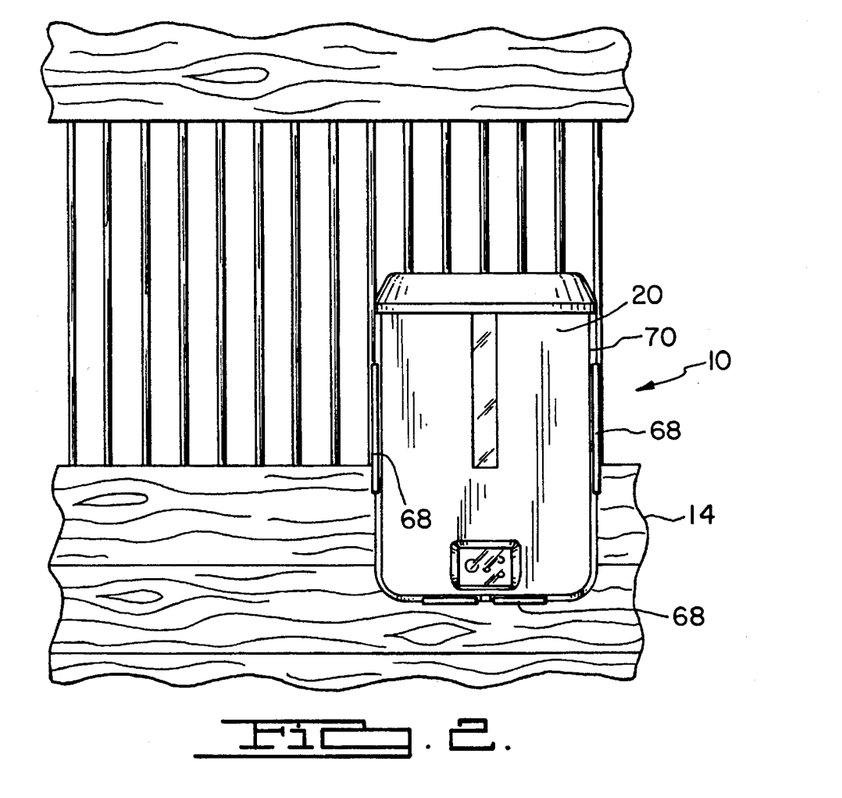
FIG. 2 is a front elevational view of the apparatus for feeding horses shown in FIG. 1 according to the teachings of one preferred embodiment of the present invention.

Referring initially to FIG. 1, an apparatus 10 for feeding a horse is shown. The apparatus 10 is used for automatically dispensing feed to a horse at predetermined regular intervals. The apparatus 10 is illustrated in operative association with barn 12 having a plurality of partitions 14 which define a plurality of stalls 16. The apparatus 10 is mounted outside each of the stalls 16 and is therefore protected from being damaged by movement of the horses within the stalls 16. In addition, the apparatus 10 is located at a position which is convenient for filling and cleaning. As will be appreciated by those skilled in the art, the apparatus 10 may be mounted to a swinging feeder door. In addition, the apparatus 10 may be used with a single stall 16 or a plurality of the apparatuses 10 may be used for multiple stall applications. Finally, the term "stall" as used herein will refer to any type of animal enclosure.

Figure 4:
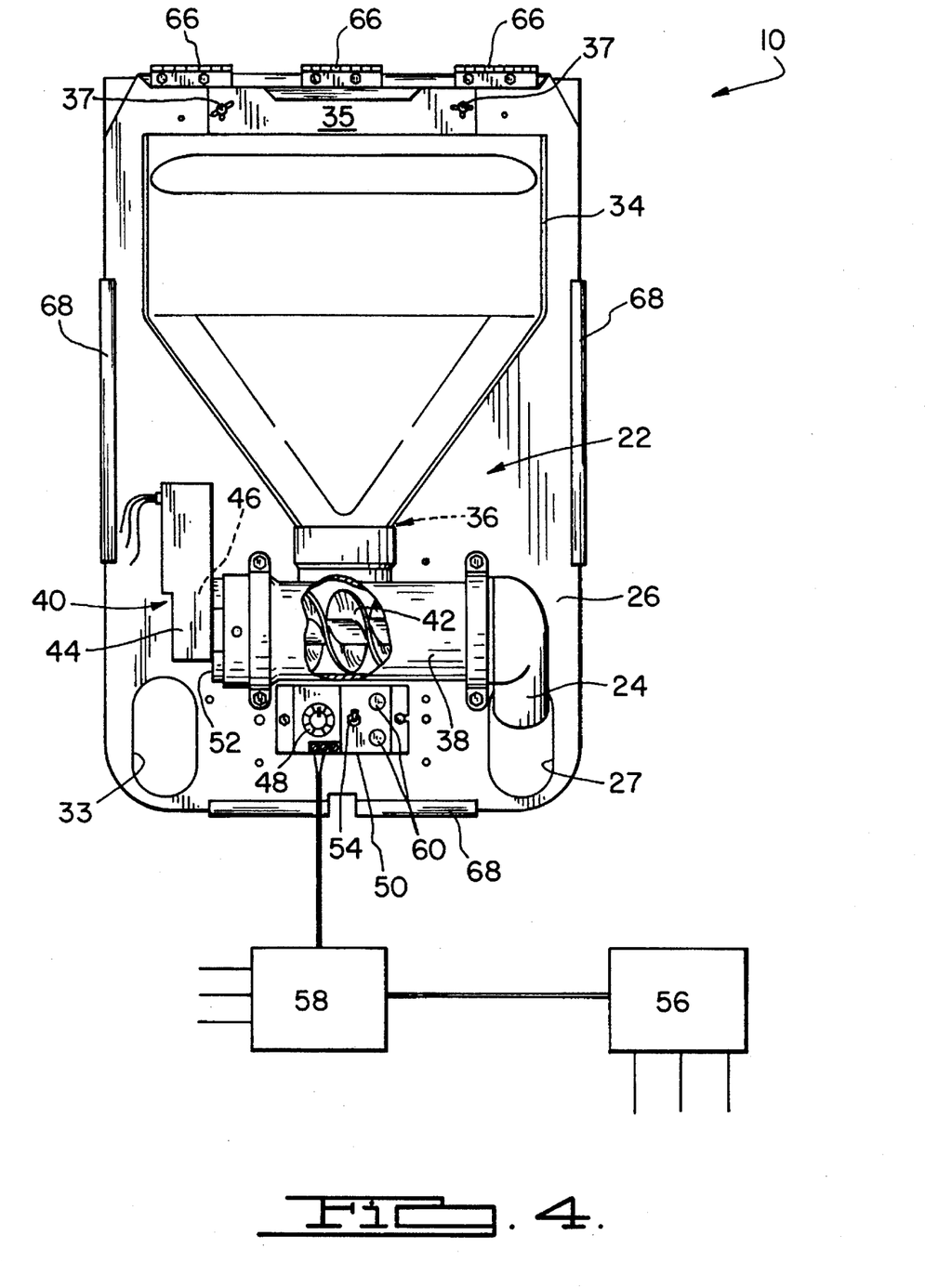
FIG. 4 is a front elevational view of the apparatus for feeding horses shown in FIG. 1 with a front cover member removed according to the teachings of one preferred embodiment of the present invention.

The structure and operation of the apparatus 10 will now be described in greater detail. The apparatus 10 of the present invention includes a cover member 20 and a feed unit 22. The cover member 20 is used to protect the feed unit 22 from the environment, while the feed unit 22 is used to deliver feed to the stall 16 for a predetermined duration of time upon the receipt of an electrical control signal. The feed unit 22 includes a feed tube 24 and a back panel 26. The back panel 26 of the feed unit 22 is operable to be mounted to the outside surface 14a of the partition 14 in such a manner as to permit the feed tube 24 to extend through a hole 27 in the back panel 26, through the partition 14, and into the stall 16. The back panel 26 is designed to removably engage a suitable mounting bracket 28 which is securely fastened to the partition 14 by means of screws or the like. This is advantageous in that the apparatus 10 is both easy to install and easy to remove for servicing. A feeder pan 30 of choice then needs to be mounted inside surface 14b of the partition 14 such that the outlet hole 32 of the feed tube 24 is approximately one to three inches above the top of the feeder pan 30.

To provide means for storing a quantity of feed before being delivered to the stall 16, the feed unit 22 also includes a funnel-shaped hopper 34. The hopper 34 is preferably constructed of a visually transparent material for reasons which will become apparent below. To deliver feed from the hopper 34 to the feed tube 24, the feed unit 22 further includes a feeder body 38. The feeder body 38 communicates with an outlet 36 of the hopper 34 which is at the lower end of the hopper 34. In addition, one end of the feeder body 38 is also connected to the feed tube 24. Accordingly, the feeder body 38 is able to receive feed which is located within the hopper 34 and deliver the feed to the feeder pan 30 through the feed tube 24.

As will be appreciated by those skilled in the art, the apparatus 10 may be configured to dispense feed from either side of the back panel 26. In this regard, the back panel 26 is provided with a hole 33 which is able to receive the feed tube 24 if it is desired to dispense feed from the left side of the back panel 26. In such a circumstance, the feeder body 38 is disconnected from the back panel 26 and is rotated 180° before being reconnected to the back panel 26. The feed tube 24 is then rotated with respect to the feeder body 38 so that the feed tube 24 extends through the hole 33.

The feed which is contained within the hopper 34 may have between seven and ten percent molasses content which readily produces a film on the walls of the hopper 34. Accordingly, it is desirable to have the hopper 34 be readily removable from the feeder body 38 so as to facilitate cleaning. For this reason, the feed unit 22 further includes a removable support plate 35. The removable support plate 35 is attached to the upper portion of the back panel 26 by means of a plurality of wing nuts 37. The support plate 35 extends outwardly and has a downwardly extending flange which is engageable with the upper portion of the hopper 34. Accordingly, the support plate 35 is able to prevent the hopper 34 from being displaced from the back panel 26, while allowing the hopper 34 to be detached from the feeder body 38 so that the hopper 34 may be easily cleaned.

To provide means for transporting the feed from the hopper 34 through the feeder body 38 to the stall 16, the feed unit 22 further comprises a gear motor assembly 40. The gear motor assembly 40 includes an auger 42 which is able to rotate within the feeder body 38 and deliver feed from the hopper 34 to the feed tube 24. The auger 42 is of the twin-helix type so as to prevent feed from falling through the feed unit 22 when the auger 42 is not being rotated. Accordingly, the auger 42 will prevent the delivery of feed to the stall 16 if the apparatus 10 should fail. The auger 42 is preferably $2^{15}/_{16}$ inch in diameter with a $3¼$ inch pitch. The auger 42 is preferably made from steel and is commercially available from Uniflyte. However, the auger 42 may be formed from other suitable materials such as polymeric based materials.

The gear motor assembly 40 further includes a torque box 44 which has a stall motor 46 for driving the auger 42. The stall motor 46 is designed so that when the auger 42 encounters resistance to movement, the motor 46 will stall so as to prevent further rotation of the auger 42 and prevent damage to the motor 46. Such resistance to movement could typically occur where the feed is dirty, such as when the feed would include a corn cob. The torque box 44 is powered by a 24 volt AC supply, has an output of 20 rpm and generates a torque of 20 inch-pounds. The torque box 44 may be that which is available from MultiProducts, Racine, Wis., though other suitable torque boxes may be used.

The feed unit 22 is equipped with a timer 48 which is able to engage a timer bracket 50 mounted on the back panel 26. The timer 48 is operable to control the length of time at which the auger 42 rotates and therefore the amount of feed which is delivered by the feed unit 22 to the feeder pan 30. The timer 48 is preferably of the plug-in type so as to allow the timer 48 to be easily replaced if the timer 48 should fail. The timer 48 includes a dial which may be selectively set to the duration of time during which the auger 42 rotates. While the timer 48 may be Model No. H3G-8A available from Omron, other suitable timers may be used.

The feeder unit 22 further includes a plug 52 which is secured to the feeder body 38 by a hex screw. The plug 52 is used to support the torque box 44 with respect to the feeder body 38, as well as to secure the auger 42 within the feeder body 38. As will be appreciated by those skilled in the art, the plug 52 may be removed from the feeder body 38 so as to allow the auger 42 to be withdrawn from the feeder body 38 to permit cleaning and servicing.

To control the mode of operation of the apparatus 10, the apparatus 10 further includes a toggle switch 54. The toggle switch 54 is a three-positional switch which is selectable by the user to determine the type of operation which the apparatus 10 is to provide. In this regard, the switch 54 may be set to the automatic position which causes the apparatus 10 to be controlled by the master transformer/timer assembly as will be more fully described below. Alternatively, the switch 54 may be displaced to the manual position which causes the torque box 44 to rotate the auger 42 until the switch 54 is displaced from the manual position. Finally, the switch 54 may be set to the off position to prevent the torque box 44 from rotating the auger 42.

Figure 7:
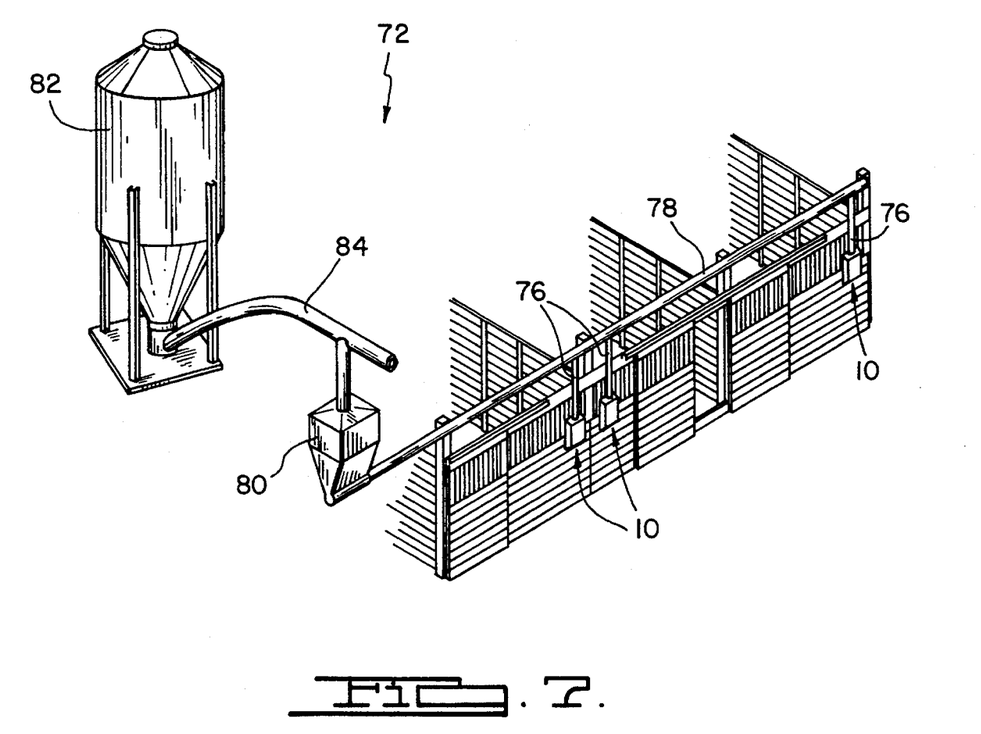
FIG. 7 is a perspective view of the feeding system using the apparatus for automatically feeding horses according to the teachings of a second preferred embodiment of the present invention.

As discussed above, the timer 48 is used to control the duration during which feed is delivered by the apparatus 10 once the apparatus 10 receives an electrical control signal. To provide means for generating the electrical control signal, a master transformer/timer assembly 56 is provided. The master transformer/timer assembly 56 is operable to permit the user to select the time at which each of a number of feeding cycles will begin. Typically, the master transformer/timer assembly 56 will be adjusted so as to cause a feeding cycle to begin at every 2–4 hour intervals. The master transformer/timer assembly 56 may be used to control a plurality of slave transformer assemblies 58 which in turn control the apparatus 10. It will be appreciated, however, that if there are relatively few stalls 16, the master transformer/timer assembly 56 may be used to drive the apparatus 10 directly. As will be more fully discussed below, the apparatus 10, the master transformer/timer assembly 56, and the slave transformer assemblies 58 (if any) serve to form a system for delivering feed to a horse.

The master transformer/timer assembly 56 is also used to convert 115 volt AC power supply to two lower voltage sources of power. The first source of power is 24 volt AC continuous voltage source which is used to drive the apparatus 10 during the manual mode of operation. In addition, the master transformer/timer assembly 56 also provides a 24 volt AC intermittent voltage source which is used to drive the auger 42 when the feeding cycle is initiated by the master transformer/timer assembly 56. To prevent damage to the apparatus 10 should excessive power be drawn by the motor 46, the apparatus 10 further includes two three amp fuses 60. One fuse 60 is used in conjunction with the continuous 24 volt source, while other fuse 60 is for use with the 24 volt AC intermittent source.

Figures 3, 5:
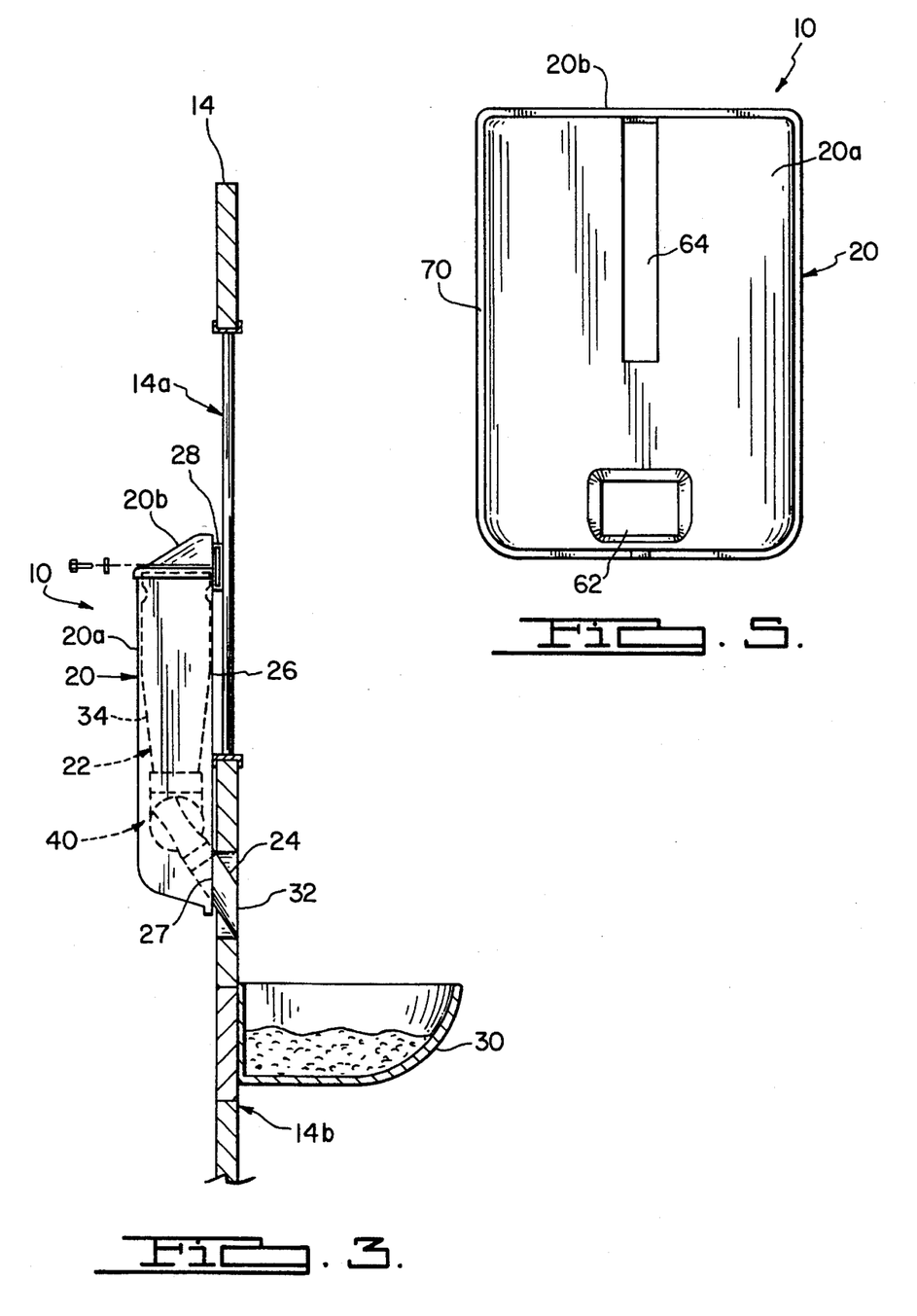
FIG. 3 is a side elevational view of the apparatus for feeding horses shown in FIG. 1 according to the teachings of one preferred embodiment of the present invention.
FIG. 5 is a front elevational view of the front cover member of the apparatus for feeding horses shown in FIG. 1 according to the teachings of one preferred embodiment of the present invention.

The cover member 20 of the apparatus 10 will now be described with reference to FIG. 5. The cover member 20 is used to enclose the components of the feed unit 22 and includes a cover body 20a. The cover body 20a has two windows 62 and 64 which are preferably made from a visually transparent material. The lower window 62 in the cover body 20a is used for examining the position of the switch 54 as well as the timer 48. The upper window 64 is used to provide means for visually inspecting the amount of feed within the hopper 34. The visual inspection permitted by the upper window 64 allows the operator to determine whether additional feed must be delivered to the hopper 34 and whether the apparatus 10 is properly functioning. In this regard, after the operator has filled the hopper 34 at the beginning of the day, if the operator subsequently notices that there is very little change in the level of feed within the hopper 34 at the end of the day, it will become apparent to the operator that the unit 22 is not functioning properly. Such a malfunction may be caused by a blockage within the feeder body 38. However, it will be appreciated that when such malfunctioning occurs, feed is unable to flow through the feeder body 38 which may otherwise cause excessive feed to be delivered to the horse.

Figure 6:
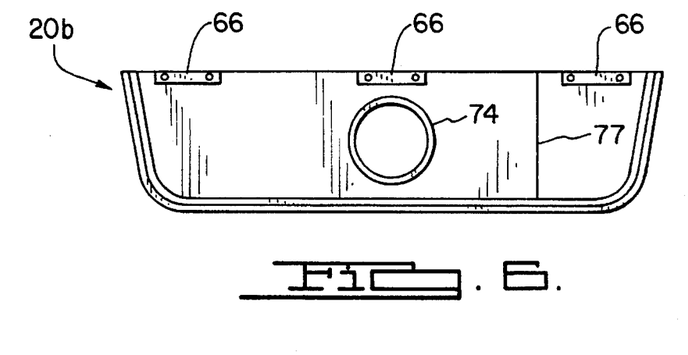
FIG. 6 is a top plan view of a top cover member of the apparatus for feeding horses shown in FIG. 1 according to the teachings of embodiments of the present invention.

The cover member 20 further includes a top portion 20b as shown in FIG. 6 which is preferably constructed of a visually transparent material. The top portion 20b is pivotally connected to the back panel 26 by a plurality of hinges 66 which allow the top portion 20b to be raised when delivering feed to the hopper 34. Access into the hopper 34 through the top portion 20b is also desirable to permit various additives, such as medicines and vitamins, to be delivered to the feed when it is necessary to provide such additives to the horse. When this occurs, it will be appreciated that the auger 42 is able to facilitate mixing such additives into the feed for subsequent delivery to a horse. Because the top portion 20b is clear, the operator can also obtain a visual indication as to the amount of feed in the hopper 34 by viewing the feed through the top portion 20b.

The back panel 26 of the feed unit 22 has cover mounting brackets 68 which are located on each side as well as the bottom of the back panel 26 as shown in FIG. 4. This allows the cover member 20 to be removably secured to the back panel 26. In this regard, each side of the cover member 20 may be compressed so as to cause a flange 70 on the cover member 20 to dislodge from the cover mounting brackets 68 which are located on the side. Then, with a slight lifting action, the cover member 20 can be removed from the back panel 26. The cover member 20 is removable so that it can be cleaned, as well as to permit the operation of the unit to be changed from one setting (manual, auto or off) to another, to replace the fuses 60, or to adjust the timer 48.

Referring now to FIG. 7, a second preferred embodiment of the invention is shown. In this regard, the present invention includes an automated feeder assembly 72 which is used to deliver feed one or two times a day to the apparatus 10 such that the hopper 34 does not have to be manually refilled. In this embodiment, the top portion 20b of the cover member 20 is provided with a circular indentation 74 as shown in FIG. 6. The circular indentation 74 may be cut out and removed, thereby providing an opening in the top cover 20b for receiving a vertical drop tube 76. As shown in FIG. 7, several vertical drop tubes 76 are in communication with several apparatuses 10 as well as with a circuit of PVC tubing 78 which receives feed from a large hopper 80. Feed is delivered to the large hopper 80 from a feed bin 82 by means of a motorized augering system 84. Accordingly, feed is automatically delivered to each of the hoppers 34 for dispensing in the manner described above. It will be appreciated that the configuration of the automated feeder assembly 72 may vary depending upon the specific implementation and may not necessarily include the large hopper 80.

As discussed above, it is sometimes necessary to add medicines and vitamins to the feed for various purposes. While this would otherwise be difficult if a vertical drop tube 76 were inserted through the opening created in the circular indentation 74, the top cover 20b also includes a linear indentation 77. The linear indentation 77 allows the top cover 20b to be severed along the indentation 77 so as to allow a portion of the top cover 20b to be raised. This would therefore permit medicine and vitamins to be delivered to the feed within the hopper 34 yet permit a vertical drop tube 76 to be inserted through the opening created in the circular indentation 74.

The method of the present invention will now be described. A plurality of apparatuses 10 are first installed within a barn 12 such that the feed unit 22 of each apparatus 10 is removably secured to the outside surface 14b of the partition 14. In particular, the feed tube 24 is inserted through an aperture which extends through the partition 14 and into the stall 16. The master transformer/timer assembly 56 is then secured at any suitably convenient location and is connected to a plurality of slave transformer assemblies 58. Each of the slave transformers assemblies 58 are then in turn connected to a plurality of apparatuses 10. It will be appreciated that the slave transformer assemblies 58 are not required if the number of apparatuses 10 used is relatively small (e.g. less than 8). Because each of the slave transformers assemblies 58 are able to deliver power to eight of the apparatuses 10, the number of slave transformer assemblies 58 will depend upon the number of the apparatuses 10.

Once the master transformer/timer assembly 56, the slave transformer assemblies 58 (if any) and the apparatuses 10 are properly located, the timer (not shown) within the master transformer/timer assembly 56 is adjusted to the desired time between feeding cycles which is preferably between 2–4 hours. After the timer within the master transformer/timer assembly 56 has been set, the duration of the feeding cycle for each of the apparatuses 10 is selected by adjusting the timer 48 on each of the apparatuses 10. Feed is then manually delivered to the hopper 34 of each of the apparatuses 10. Alternatively, feed can be automatically delivered to the hopper 34 at preselected times of each of the apparatuses 10 by means of the vertical drop tubes 76 which receive feed from the feed bin 82 through the motorized auger system 84 and the large hopper 80.

When the master transformer/timer assembly 56 determines that the feeding cycle is to begin, the master transformer/timer assembly 56 generates an electrical control signal which is delivered to each of the apparatuses 10 through the slave transformer assemblies 58 (if any). The electrical control signal causes feed to be dispensed from the hopper 34 of each of the apparatuses 10 simultaneously by rotation of the auger 42 in each of the apparatuses 10. Each of the apparatuses 10 will continue to dispense feed until the time period during which feed is dispensed exceeds the duration established by the timer 48 associated with each apparatus 10. When this occurs, further dispensing of feed is terminated until the next feeding cycle is initiated by the master transformer/timer assembly 56. In addition, the auger 42 will block the delivery of feed through the feeder body 38 until the apparatus 10 receives the electrical control signal from the master transformer/timer assembly 56.

As will be appreciated by those skilled in the art, the master transformer/timer assembly 56 causes the feeding cycles of each of the apparatuses 10 to begin at about the same time. This is desirable because horses become anxious if they are not being fed while other horses are being fed. This anxiety, which may cause the horse to injure himself or the stall 16, is prevented because each of the apparatuses 10 are synchronized by the master transformer/timer assembly 56 to deliver feed at the same time. However, because the timer 48 associated with each apparatus 10 controls the duration during which the auger 42 of the corresponding apparatus 10 rotates, the amount of feed which is delivered by each of the apparatuses 10 can be regulated. Accordingly, a larger horse is able to receive more feed than a smaller horse, though both horses will receive feed beginning at substantially the same time.

Those skilled in the art can now appreciate from the foregoing description that the broad teachings of the present invention can be implemented in a variety of forms. Therefore, while this invention has been described in connection with particular examples thereof, the true scope of the invention should not be so limited. Other modifications will become apparent to those skilled in the art.

What is claimed is:

1. A system for delivering feed to plurality of stalls at predetermined intervals of time, said system comprising:

a plurality of feed dispensing devices for delivering said feed to said plurality of stalls upon receipt of an electrical control signal; and means for generating said electrical control signal at predetermined intervals of time, said means for generating said electrical control signal including:

(a) a first timer which is operable to control when said plurality of feed dispensing devices are to initiate the delivery of feed to said plurality of stalls, and (b) a plurality of second timers which are each operable to individually control the duration during which one of said feed dispensing devices delivers feed to one of said stalls after feed delivery is initiated by said first timer.

2. The system for delivering feed as set forth in claim 1, wherein each of said feed dispensing devices is operable to prevent delivery of said feed upon failure of said system.

3. The system for delivering as set forth in claim 1, wherein each of said feed dispensing devices includes an auger which is operable to rotate to cause said feed to be delivered to one of said stalls.

4. The system for delivering feed set forth in claim 3, wherein each of said augers are operable to prevent said feed from being delivered to one of said stalls when said electrical control signal is not being generated by said means for generating said electrical control signal.

5. The system for delivering feed as set forth in claim 4, wherein each of said augers is a twin helix auger.

6. The system for delivering feed as set forth in claim 1, wherein each of said feed dispensing devices further includes:

means for storing a quantity of said feed prior to being delivered to one of said stalls; and means for visually indicating the amount of said feed within said means for storing a quantity of said feed.

7. The system for delivering feed as set forth in claim 6, wherein said means for storing a quantity of said feed includes a hopper, said hopper being at least partially formed from a visually transparent material.

8. The system for delivering feed as set forth in claim 7, wherein said means for visually indicating the amount of feed within said means for storing a quantity of feed includes a cover member, said cover member being at least partially formed from a visually transparent material.

9. The system for delivering feed as set forth in claim 1, wherein each of said stalls is at least partially defined by a partition, said feed dispensing devices being disposed generally exteriorly with respect to said stalls and being operable to deliver said feed to the interior of said stalls through said partitions.

10. A method for automatically delivering feed to a plurality of stalls, said stalls being each at least partially defined by a partition, said method comprising the step of:

generating an electrical control signal from a transformer/timer assembly;

delivering said electrical control signal to a plurality of feed dispensing devices;

controlling the operation of each of said feed dispensing devices in response to said electrical control signal so as to initiate the delivery of feed to each of said stalls by said plurality of feed dispensing devices and;

independently controlling the duration of the delivery of feed to each of said stalls.

11. The method for automatically delivering feed as set forth in claim 10, wherein said step of generating an electrical control signal includes the step of causing said transformer/timer assembly to generate said electrical control signal at a voltage less than about 115 volts.

12. The method for automatically feeding a horse as set forth in claim 10, wherein said step of generating an electrical control signal from a transformer/timer assembly includes the step of generating a continuous electrical signal having a voltage of less than about 115 volts and an intermittent electrical signal of less than about 115 volts.

13. The method for automatically delivering feed as set forth in claim 10, wherein each of said feed dispensing devices includes an auger, said step of independently controlling the operation of each of said feed dispensing devices further includes the step of causing each of said augers to rotate for different lengths of time in response to said electrical control signal.

14. The method for automatically delivering feed as set forth in claim 10, further comprising the step of preventing said feed from being dispensed from said feed dispensing devices in the absence of said electrical control signal.

15. The method for automatically delivering feed as set forth in claim 10, wherein each of said feed dispensing devices includes a hopper for storing said feed, said hopper being formed from a visually transparent material, said method further including the additional step of visually inspecting the level of said feed within said hopper.

16. A system for automatically delivering feed to a plurality of stalls, each of the stalls being defined at least in part by a partition having an inside surface and an outside surface, said system comprising:

means for storing the feed prior to being delivered to each of the stalls, said means for storing the feed being located generally exteriorly with respect to the stalls and including a plurality of hoppers, each of which are operable to store feed before being delivered to the stalls;

means for transporting the feed from said means for storing the feed through each of the partitions to each of the stalls, said means for transporting the feed including a plurality of augers, each of which are operable to rotate so as to cause the feed to be dispensed from one of said hoppers to one of the stalls, whereby said means for storing the feed and said means for transporting the feed are substantially protected from being damaged by activity within each of the stalls; and means for generating an electrical control signal at predetermined intervals of time, said means for generating an electrical control signal including:
(a) a first timer which is operable to control when said plurality of augers are to initiate the delivery of feed to the plurality of stalls, and
(b) a plurality of second timers which are each operable to individually control the duration during which one of said augers delivers feed to one of the stalls after feed delivery is initiated by said first timer.

17. The system for automatically delivering feed to a plurality of stalls as set forth in claim 16, wherein each of said hoppers are at least partially formed from a visually transparent material.

18. The system for automatically delivering feed to a plurality of stalls as set forth in claim 16, wherein each of said hoppers are removably secured to the remainder of said system as to facilitate cleaning of each of said hoppers.

19. The system for automatically delivering feed to a plurality of stalls as set forth in claim 16, wherein said means for transporting the feed further includes a plurality of feeder bodies which are operable to deliver feed from one of said hoppers to one of the stalls.

20. The system for automatically delivering feed to a plurality of stalls as set forth in claim 19, wherein each of said feeder bodies includes a back panel, each of said feeder body being operable to be oriented with respect to one of body said back panels at one of a plurality of positions.

21. The system for automatically delivering feed to a plurality of stalls as set forth in claim 16, wherein each of said augers is operable to prevent said feed from being delivered to one of the stalls when said electrical control signal is absent.

22. The system for automatically delivering feed to a plurality of stalls as set forth in claim 16, wherein each of said augers is a twin helix auger.

23. The system for automatically delivering feed to a plurality of stalls as set forth in claim 16, wherein each of said augers is driven by a motor.

24. A method for automatically delivering feed to a plurality of stalls, said method comprising the steps of;

delivering the feed to a plurality of feed dispensing devices, each of which is disposed on the exterior of one of the stalls, said feed dispensing devices each having an auger;

generating an electrical control signal which is able to be delivered to each of said feed dispensing devices;

causing each of said augers within each of said feed dispensing devices to rotate upon receipt of said electrical control signal by said feed dispensing devices;

dispensing said feed from said feed dispensing devices to the stalls upon rotation of said augers and independently controlling the duration of the delivery of feed to each of the stalls by controlling the duration of which each of said augers is able to rotate.

25. A system for automatically delivering feed to a plurality of stalls, said system comprising:

a plurality of feed dispensing devices for delivering the feed to the plurality of stalls upon receipt of an electrical control signal;

a feed bin for storing the feed;

means for delivering the feed stored in said feed bin to said plurality of feed dispensing devices; and control means for generating said electrical control signal, said control means including:
  (a) a first timer which is operable to control when said plurality of feed dispensing devices are to initiate the delivery of feed to the plurality of stalls, and
  (b) a plurality of second timers which are operable to independently control the duration of the delivery of feed to the stalls after feed delivery is initiated by said first timer.

26. The system for automatically delivering feed as set forth in claim 25, wherein said means for delivering the feed includes a hopper for receiving the feed stored in said feed bin.

27. The system for automatically delivering feed as set forth in claim 26, wherein said means for delivering the feed further includes a motorized augering system for delivering said feed stored in said feed bin to said hopper.

28. The system for automatically delivering feed as set forth in claim 27, wherein said delivery means for delivering said feed further includes a plurality of tubes for delivery of said feed from said hopper to said plurality of feed dispensing devices.

29. The system for automatically delivering feed as set forth in claim 25, wherein each of said feed dispensing devices includes an auger which is operable to rotate to cause the feed to be delivered to one of the stalls.

30. The system for automatically delivering feed as set forth in claim 25, wherein each of said feed dispensing devices further includes:

means for storing a quantity of the feed prior to being delivered to one of the stalls; and means for visually indicating the amount of the feed within said means for a storing a quantity of said feed.

31. The system for automatically delivering feed as set forth in claim 25, wherein each of the stalls is at least partially defined by a partition, said feed dispensing devices being disposed generally exteriorly with respect to the stalls and being operable to deliver the feed to the interior of the stalls through said partitions.

32. The system for automatically delivering feed as set forth in claim 25, wherein each of said feed dispensing devices includes a hopper which is operable to store the feed before being delivered to the stalls.

* * * * *